(12) United States Patent
Gassner et al.

(10) Patent No.: US 6,242,505 B1
(45) Date of Patent: Jun. 5, 2001

(54) USE OF A PHOTOPOLYMERIZABLE COMPOSITION FOR THE DECORATION OF METALLIC ORNAMENTS

(75) Inventors: Alfred Gassner, Vaduz; Dieter Voser, Schaan, both of (DE)

(73) Assignee: Ivoclar AG (LI)

( * ) Notice: Subject to any disclaimer, the term of this patent is extended or adjusted under 35 U.S.C. 154(b) by 0 days.

(21) Appl. No.: 09/036,116

(22) Filed: Mar. 6, 1998

Related U.S. Application Data

(60) Provisional application No. 60/052,562, filed on Jul. 15, 1997.

(30) Foreign Application Priority Data

Mar. 7, 1997 (DE) .............................. 197 09 280

(51) Int. Cl.⁷ ....................................... C08F 2/46
(52) U.S. Cl. ................................................. 522/18
(58) Field of Search ................................. 522/18

(56) References Cited

U.S. PATENT DOCUMENTS

| | | | |
|---|---|---|---|
| 4,076,536 | * | 2/1978 | Schlesinger ............... 522/32 |
| 4,214,026 | * | 7/1980 | Ibata ........................ 428/67 |
| 5,180,757 | * | 1/1993 | Lucey ....................... 522/76 |
| 5,750,590 | * | 5/1998 | Schaefer .................... 522/31 |

FOREIGN PATENT DOCUMENTS

| | | |
|---|---|---|
| 3633049 A1 | 7/1987 | (DE) . |
| 0 737 567 A1 | 10/1996 | (DE) . |
| 0 542 219 A2 | 5/1993 | (EP) . |
| 2 737 427 | 2/1997 | (FR) . |
| 52-043566 | 5/1977 | (JP) . |
| 5-93070 | 1/1984 | (JP) . |
| 59-86603 | 5/1984 | (JP) . |
| 59-86604 | 5/1984 | (JP) . |
| 62-110782 | 5/1987 | (JP) . |
| 05093070 | 4/1993 | (JP) . |

* cited by examiner

*Primary Examiner*—Paul R. Michl
(74) *Attorney, Agent, or Firm*—Nixon Peabody LLP

(57) ABSTRACT

The use of a photopolymerizable composition containing methacrylate and filler as decoration of metallic ornaments is described, in which the composition is applied to the article to be decorated and is photopolymerized.

10 Claims, No Drawings

USE OF A PHOTOPOLYMERIZABLE COMPOSITION FOR THE DECORATION OF METALLIC ORNAMENTS

This application claims benefit to U.S. provisional application 60/052,562 filed Jul. 15, 1997.

The invention relates to the use of a photopolymerizable composition for the decoration of metallic ornaments, in which in particular compositions containing methacrylate are used.

Esters of acrylic acid and methacrylic acid, which are also referred to as (meth)acrylates, have been used in the past also for the manufacture of costume jewellery or artificial precious stones. Thus EP-A-581 999 discloses a precious stone imitation consisting of polymethyl methacrylate which can be applied permanently to textiles by means of a heat-sealing adhesive.

DE-A-39 17 376 describes the use of acrylic resin for the coating of metal parts of costume jewellery in order to rule out in this way the direct contact of metal and skin which can under some circumstances lead to irritations and allergies.

Further DE-A-20 51 965 discloses plastics ornaments based on coloured polymethyl methacrylate.

DE-A-24 08 640 describes polymerizable polymer/monomer mixtures which contain acrylic monomer and serve in particular for the manufacture of dentures, but are also said to be suitable for the production of ornaments and objets d'art.

JP-A-59086604 and JP-A-59086603 disclose compositions which contain acrylates but no fillers. The compositions can be cured by irradiating with light and they are useful for the preparation of transparent ornaments.

JP-A-5093070 describes also photocurable materials which comprise (meth)acrylates and which serve for the production of e.g. buttons. However, the manufacture of decorative elements on a metallic substrate are not disclosed.

Moreover, DE-A-30 48 823 discloses a resin composition which can be cured by means of UV radiation and which can contain various acrylates in addition to saturated copolyester and photo-sensitizer. The composition is used for the manufacture of printing inks in particular or transfer papers for the decoration of pottery.

Finally, DE-C-44 12 715 describes the use of mixtures of precious metal powder and methyl methacrylate/styrene resin for the manufacture of cheap ornaments which display a lesser density compared with the articles consisting wholly of precious metal.

The known materials used for manufacture of plastics ornaments are generally based on acrylates which are rather undesirable for toxicological reasons. Moreover, these materials are not showing the flow properties required to allow the easy forming of even complicated decorative elements on a substrate. Additionally, their mechanical properties after curing, such as hardness, scratch resistance, impact resistance and bending strength, are generally not satisfactory.

In the manufacture of metallic ornaments, strongly coloured enamels have recently been used as decorative elements in addition to the conventional setting of precious stones. However, these enamels are frequently seen only as an inferior decorative element, as their lack of transparency means that they do not offer the optical effect, still frequently desired, of precious stones or semi-precious stones. Furthermore, the application of enamels is complicated, as a heating of the ornament to high temperatures is necessary. Enamels are also very brittle, for which reason they are not suitable for the formation of more complicated decorative elements, such as ring-shaped elements. Finally, enamels adhere very well to metal, which results in they being removable only with great difficulty, e.g. by means of hydrofluoric acid, when adjustments are necessary.

The object of the invention is therefore to make available the use of a composition for the decoration of metallic ornaments in which the composition possesses flow properties allowing the processing in a simple way to form even complicated decorative elements on the article, these decorative elements resembling precious stones or semi-precious stones in their optical appearance and displaying excellent mechanical properties and good lustre. These decorative elements are also to be easy to remove and thus to adjust.

This object is achieved by the use according to the invention according to any one of claims 1 to 9. The invention also relates to the process for the manufacture of decorated metallic articles according to claim 10.

According to the invention, a photopolymerizable composition containing methacrylate and filler is used for the decoration of metallic ornaments, by applying the composition to the article to be decorated and photopolymerizing the composition.

It is an advantage of the present invention that the methacrylates used are not causing the undesired toxicological concerns as acrylates. Therefore, the goldsmith is not exposed to harmful substances to such an extent as is the case when processing the prior art material based on acrylates.

Examples of usable methacrylates are methyl methacrylate, isobutyl methacrylate and cyclohexyl methacrylate.

Methacrylates with at least two methacrylate groups are preferably used in the composition, as such compounds lead after photopolymerization to decorative elements which display a particularly high hardness and strength. The result of this high hardness is that the decorative element does not become dull on the surface even after the ornament has been worn for some time, but continues to display a good lustre. Moreover, such compositions are also distinguished by a very low impact sensitivity.

Preferred methacrylates having at least two methacrylate groups are tetraethylene glycol dimethacrylate,
diethylene glycol dimethacrylate,
ethylene glycol dimethacrylate,
polyethylene glycol dimethacrylate,
butanediol dimethacrylate,
hexanediol dimethacrylate,
decanediol dimethacrylate,
Bisphenol-A-dimethacrylate and/or
trimethylol propane trimethacrylate.
Particularly preferably used are
triethylene glycol dimethacrylate,
2,2-bis-4-(3-methacryloxy-2-hydroxy-propoxy)-phenylpropane (bis-GMA) and/or
a urethane methacrylate having at least two methacrylate groups.

Urethane methacrylates are usually manufactured by reacting isocyanates, in particular di- and/or triisocyanates, with ethacrylates having OH groups.

The composition used according to the invention also comprises a filler. Preferred fillers are quartz and glass ceramic powders, aluminium oxides and/or silicon oxides. Particularly preferred fillers are glass powders, e.g. barium glass, barium silicate glass, lithium or aluminium silicate glass powder and finely divided silicas, such as pyrogenic or precipitated silicas.

The fillers are preferably used in a quantity of 9 to 25, in particular 9 to 19 wt. %.

The filler content imparts a flow behaviour to the composition such that the composition can be employed for the forming of complicated decorative elements, e.g. ring-shaped structures. The type and the amount of the filler ensures that an easy applying and spreading on the substrate is possible, but that no undesired dripping off or flowing away occurs. Further, the filler results in a substantial improvement of the mechanical properties and in particular the hardness and strength of the final decorative element.

In order that the decorations formed from the composition used according to the invention resemble coloured precious stones or semi-precious stones in their optical appearance, the composition preferably contains a dye and/or pigment. The following dyes/pigments are particularly preferably used for this purpose: black:

Microlith black C-T, carbon black pigment (preparation) C.I. Pigment black 7 No. 77266; Ciba Geigy white:

Titanium dioxide E 171, Kronos 1171, Kronos Titan GmbH red:

Microlith red BR-T, C.I. Pigment red 144 Azo condensation pigment (preparation), Ciba Geigy yellow:

Cosmenyl yellow 10G, Pigment yellow 3, C.I. No. 11710, Hoechst

Cosmenyl yellow G, Pigment yellow 1, C.I. No. 11680, Hoechst

Sicotransgelb L 1916, Iron oxide pigment, BASF green:

Cosmenyl green GG, Pigment green 7, C.I. No. 74260, Hoechst violet:

Cosmenyl violet RL, Pigment violet 23, C.I. No. 51319, Hoechst pearl white:

Iriodin 120 Glanzsatin, Merck blue:

Ultramarine blue L 6498, BASF

The dyes and/or pigments are preferably used in a quantity of 0.03 to 5 wt. %, in particular 0.03 to 2.5 wt. % relative to the composition.

The composition also preferably contains a photoinitiator, which can in particular be benzophenone or a benzophenone derivative, benzoin or a benzoin derivative, an α-diketone, such as 9,10-phenanthrenequinone, diacetyl, furil, anisil, 4,4'-dichlorobenzil and 4,4'-dialkoxybenzil or acylphosphine oxides. Camphor quinone is particularly preferably used as photoinitiator. In order to achieve particularly fast-curing compositions, it has proved advantageous to use the photoinitiators together with an activator. A reduction agent and in particular an amine is preferably used as activator. Particularly preferred amines are N,N-dimethyl-p-toluidine, N,N-dihydroxy-ethyl-p-toluidine and in particular N,N-cyanoethylmethylaniline.

The photoinitiators and activators are preferably used in a total quantity of 0.05 to 2.0 wt. % and particularly preferably 0.1 to 5 0.8 wt. %.

Finally, other additives, such as polymerization inhibitors, e.g. hydroquinone monomethyl ether (MEHQ), and light stabilizers can be added to the composition used according to the invention.

In particular, a composition is used which contains
(a) 70 to 90 wt. %, in particular 80 to 90 wt. % methacrylate,
(b) 0.03 to 5 wt. % dye and pigment,
(c) 9 to 25 wt. %, in particular 9 to 19 wt. % filler, and/or
(d) 0.05 to 2.0 wt. % photoinitiator and activator.

According to the invention metallic ornaments such as rings, brooches, pins, bracelets and watches, are decorated by means of the photopolymerizable composition, i.e. provided with decorative elements. It is also possible to use the photopolymerizable composition for the reproduction of lost precious stones or semi-precious stones, e.g. of watches, jewellery or costume jewellery.

With the use according to the invention, the composition is applied to the article to be decorated. It is also possible to first provide that area of the article which is to be decorated with an adhesion promoter, such as e.g. adhesion promoters for metal and plastics, in particular based on methacryloyloxydecyldihydrogen phosphate, hydrophobic dimethacrylates and benzoyl peroxide, and then likewise with an adhesive, before the composition is applied. The adhesion promoter serves to form a good bond between the metal surface and the adhesive used. Adhesives which cure rapidly by means of UV light, in particular those based on urethane acrylate, are preferably used.

The composition which is then applied is due to its filler content of such a consistency that, on the one hand, it permits a complete and rapid covering of the area to be decorated but, on the other hand, does not flow away or drip from this area. The fact that the composition used according to the invention is transparent and essentially bubble-free, and thereby closely resembles precious stones in their appearance, has proved to be a particular advantage during processing. Depending on the dyes optionally added to the composition, sapphires, rubies or emeralds can be imitated for example.

After that area of the ornament which is to be decorated has been provided with the composition in the desired way, the composition is photopolymerized and thus cured. A possible advantageous procedure here is to first subject the composition to initial curing by means of a hand-held light apparatus, in order to achieve a fixing in this way. Because of the high reactivity of the composition, an irradiation with light for ca. 5–10 seconds is wholly adequate as a rule for this. In this way it is possible for the goldsmith to fix a satisfactory decorative element within a very short time after it has been prepared. With conventional decorative elements, such as e.g. enamels, this is possible only through lengthy heating to high temperatures.

The decorated ornament is usually fully cured in a light-polymerization apparatus, after the initial curing of the composition by means of a hand-held light apparatus. Apparatus used in the dental field can be used as hand-held light apparatus and light-polymerization apparatus. The photopolymerization is preferably carried out by means of blue light.

After the photopolymerization the composition displays a very good lustre, is deeply transparent and aesthetically very appealing. Moreover, the composition also has a high hardness, which is manifested in a very good resistance to scratching. Overall, the decorations that can be produced by means of the composition used according to the invention can be manufactured on the metallic ornaments in a way that is very easy for the goldsmith and show a very strong resemblance to precious stones or semi-precious stones in their appearance.

If desired, the compositions can also be processed further after the photopolymerization, e.g. they can be ground so that their appearance approximates more closely to that of precious stones. An after-polishing is also possible, although the intrinsic lustre of the cured composition is already very high in most cases.

Mechanical adjustments to the obtained decorative element can also be carried out in a simple way.

Finally, the invention also relates to a process for the manufacture of decorated metallic ornaments, in which the photopolymerizable composition containing methacrylate and filler is applied to the article to be decorated and is photopolymerized.

The invention is explained in more detail below by means of examples.

EXAMPLES

Example 1

Firstly, the uncoloured composition given below was manufactured by intimate mixing of the stated components:

| Uncolored composition | |
|---|---|
| Component | Wt. % |
| 2,2-bis-4-(3-methacryloxy-2-hydroxy-propoxy)-phenyl propane (bis-GMA) | 35.32 |
| Urethane dimethacrylate | 31.28 |
| Triethylene glycol dimethacrylate | 16.92 |
| Hydroquinone monomethyl ether (MEHQ) | 0.08 |
| Camphor quinone | 0.25 |
| Cyanoethylmethylaniline (CEMA) | 0.42 |
| UV stabilizer (Tinuvin P, Ciba Geigy) | 0.25 |
| Fluorescent additive Lumilux flu L blue (Riedel de Haen) | 0.03 |
| Finely divided silica (Aerosil ®) | 0.45 |
| Glass powder, silanized | 15.00 |
| Total | 100.00 |

Dyes or pigments were added to this uncoloured composition according to the following table, in order e.g. to imitate a sapphire, an emerald, a ruby or an amethyst.

into the groove, no bubbles were produced and no outflow of the composition from the groove occurred either. An optional possibility was to heat the composition to ca. 60° C., in order to facilitate the inflow and remove bubbles which may form as a result of improper handling. After the groove was completely filled, the composition was subjected to initial hardening by irradiation using a hand-held light apparatus with an emission spectrum of 400 to 500 nm (Heliolux from Vivadent) within a period of 5–10 seconds. For the complete hardening, the ring decorated with the composition was irradiated in a light-polymerization apparatus with an emission spectrum of ca. 300 to 600 nm for a period of 5 minutes (Spectramat from Ivoclar). After curing, the manufactured decoration displayed a very good lustre, was deeply transparent and aesthetically extremely appealing.

If wished, it was also possible to employ the used dyes/pigments in such concentrations as led to the loss of transparency and thus to opaque decorations. This can be desired if e.g. the non-transparent semi-precious stones are to be copied. In this case, amending the above procedure, the groove of the blank was sand-blasted before the adhesion promoter (Targis Link from Ivoclar) was applied, and the use of the UV adhesive was dispensed with.

What is claimed is:

1. A method of decorating a metallic ornament with elements resembling precious or semi-precious stones comprising: applying a photopolymerizable composition comprising 70 to 90 wt. % of a methacrylate; 0.03 to 5 wt. % of a dye and pigment; 0.05 to 2.0 wt. % of a photoinitiator and activator; and 9 to 25 wt. % of a filler to the metallic ornament to be decorated and photopolymerizing the photopolymerizable composition to produce an ornament with elements resembling precious or semi-precious stones.

2. The method according to claim 1, wherein the methacrylate has at least two methacrylate groups.

3. The method according to claim 2, wherein the methacrylate is selected from the group consisting of

| Component (wt. %) | blue | green | ruby red | amethyst violet | amber yellow | black |
|---|---|---|---|---|---|---|
| Uncolored composition | 98.00% | 99.50% | 96.15% | 99.88% | 99.50% | 99.80% |
| Ultramarine blue L 6498 | 2.00% | — | — | — | — | — |
| Cosmenyl green GG | — | 0.50% | — | — | — | — |
| Microlith red BR-T | — | — | 3.85% | — | — | — |
| Cosmenyl violet RL | — | — | — | 0.12% | — | — |
| Sicotransgelb L1916 | — | — | — | — | 0.50% | — |
| Microlith black C-T | — | — | — | — | — | 0.20% |
| Total | 100% | 100% | 100% | 100% | 100% | 100% |

The individual coloured compositions given above were used in the way explained below to decorate a ring.

For this, ring blanks made from 18 carat gold with a groove extending centrally over the outer surface of the blank were used. Firstly, an adhesion promoter which guarantees a good bond between metal surface and adhesive was introduced into this groove. A fast-curing UV adhesive based on urethane acrylate (Loctite® 3105) was then applied to the adhesion promoter and cured. The coloured composition in question was then introduced into the groove. A layerwise application was also possible without the properties of the finished decoration having been greatly impaired. The viscosity of the composition guaranteed a good flow tetraethylene glycol dimethacrylate,
diethylene glycol dimethacrylate,
ethylene glycol dimethacrylate,
polyethylene glycol dimethacrylate,
butanediol dimethacrylate,
hexanediol dimethacrylate,
decanediol dimethacrylate,
dodecanediol dimethacrylate,
Bisphenol-A-dimethacrylate,
trimethylol propane trimethacrylate, and
mixtures thereof.

4. The method according to claim 2, wherein the methacrylate is selected from the group consisting of triethylene glycol dimethacrylate, 2,2-bis-4-(3-methacryloxy-2-hydroxy-propoxy)-phenyl propane, a urethane methacrylate having at least two methacrylate groups, and mixtures thereof.

5. The method according to claim 2 wherein the composition further comprises a dye, a pigment, or a mixture thereof.

6. The method according to claim 5 wherein the filler is selected from the group consisting of quartz powder, glass powder, glass ceramic powder, aluminum oxide, silicon oxides, finely divided silica, and mixtures thereof.

7. The method according to claim 5 wherein the composition further comprises a photointiator.

8. The method according to claim 7, wherein the photoinitiator is selected from the group consistion of benzophenone, a benzophenone derivative, benzoin, a benzoin derivative, an α-diketone, an acyl phosphine oxide, camphor quinone, and mixtures thereof.

9. The method according to claim 1, further comprising treating the metallic ornament with an adhesion promoter prior to applying the photopolymerizable composition to the metallic ornament.

10. The method according to claim 1, wherein the composition comprises:

80 to 90 wt. % methacrylate and 9 to 19 wt. % filler.

* * * * *